Figure 1:
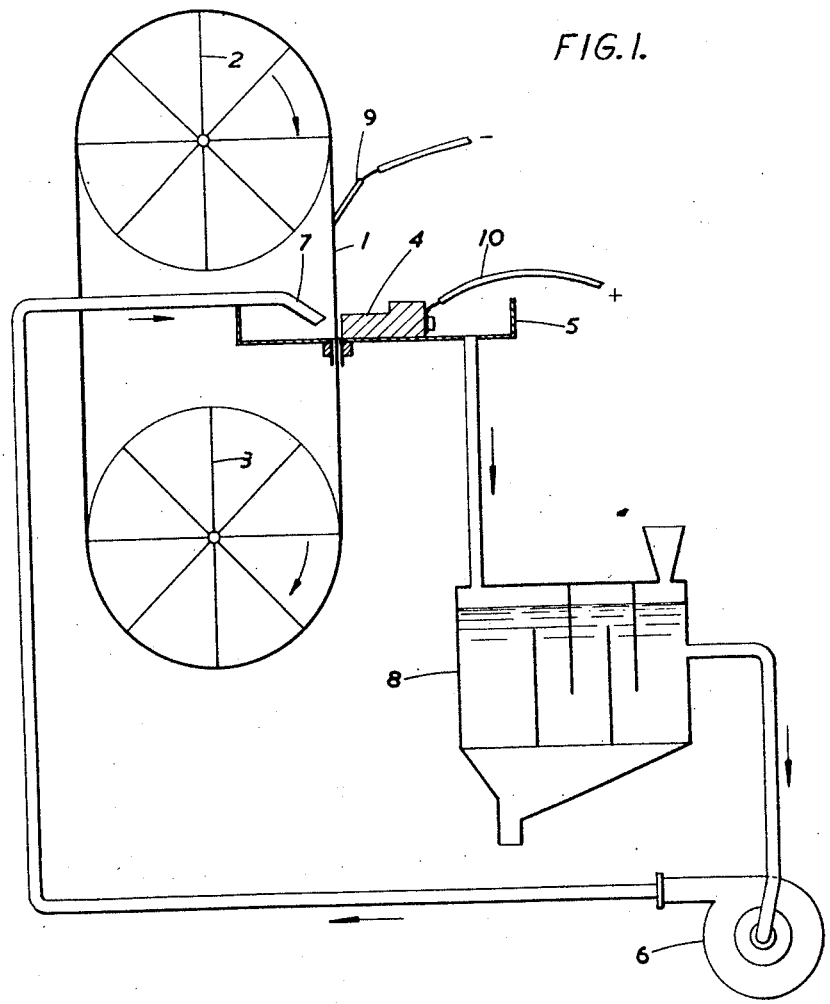

Oct. 17, 1950     D. W. RUDORFF     2,526,423
APPARATUS AND METHOD FOR CUTTING MATERIALS

Filed April 6, 1948     9 Sheets-Sheet 1

INVENTOR
DAGOBERT WILLIAM RUDORFF his ATTORNEY.

Oct. 17, 1950 D. W. RUDORFF 2,526,423
APPARATUS AND METHOD FOR CUTTING MATERIALS
Filed April 6, 1948 9 Sheets-Sheet 2

Inventor
DAGOBERT WILLIAM RUDORFF
By Ernest H. Mechlin
Attorney

Oct. 17, 1950   D. W. RUDORFF   2,526,423
APPARATUS AND METHOD FOR CUTTING MATERIALS
Filed April 6, 1948   9 Sheets-Sheet 4

Inventor
DAGOBERT WILLIAM RUDORFF
By Ernest F. Mechlin
Attorney

Oct. 17, 1950 D. W. RUDORFF 2,526,423
APPARATUS AND METHOD FOR CUTTING MATERIALS
Filed April 6, 1948 9 Sheets-Sheet 6

Inventor
DAGOBERT WILLIAM RUDORFF
By Ernest S. Mechlin
Attorney

Oct. 17, 1950  D. W. RUDORFF  2,526,423
APPARATUS AND METHOD FOR CUTTING MATERIALS
Filed April 6, 1948  9 Sheets-Sheet 9

Inventor
DAGOBERT WILLIAM RUDORFF
By Ernest H. Mechlin
Attorney

Patented Oct. 17, 1950

2,526,423

UNITED STATES PATENT OFFICE 2,526,423

APPARATUS AND METHOD FOR CUTTING MATERIALS

Dagobert William Rudorff, London, England

Application April 6, 1948, Serial No. 19,395
In Great Britain April 10, 1947

9 Claims. (Cl. 219—15)

This invention relates to apparatus for cutting electrically conductive materials, more especially hard metals such as carbides, metal ceramic masses, tool steels, and stainless steels, by the erosive effect of electric sparks.

An electric spark is a high frequency oscillatory discharge and as such is fundamentally different from the electric arc which constitutes a continuous electrically conductive gaseous bridge of high temperature between two electrodes. Various forms of employment of an electric arc for the purpose of cutting metal have been attempted in the past but the wide jagged cuts produced and the deleterious effect of the high temperature of the electric arc upon the structure of the metal to be cut have prevented the industrial application of this method. Limited use has also been made of electrolytic action for the cutting of metals but this method suffers from the slowness of its action and its inaccuracy of application engendered by the straying of the electric current in the electrolyte.

It is an object of the invention to provide an improved apparatus by means of which the cutting rate and the accuracy of cutting will be enhanced with a minimum of wear on the electrode which forms the cutter member, while at the same time being economical in the consumption of current.

For satisfactory operation apparatus cutting by spark action requires high current densities at the cutting edge, particularly when cutting large sections, and it is another object of the invention to provide an apparatus in which such densities can be obtained and maintained by preventing extension of the area of current discharge as the cutting proceeds.

Broadly stated, an apparatus according to the present invention, for cutting electrically conductive materials, consists of a cutter member maintained during the cutting operation in a predetermined close relation to the metal to be removed from the workpiece in order to effect the cut, an electric circuit in which are included the cutter member and the workpiece and a source of direct current supply, in such manner that the electric oscillations of a spark discharge are continuously produced at the cutting edge of the cutter member, and means maintaining while cutting is in progress a constant fluid flow through the cutting zone to remove therefrom the particles of material detached from the workpiece and to keep the cutting zone continually cooled.

In addition to the feed motion required for maintaining the continuity of the cutting action, relative motion between cutting edge and workpiece at the point of cutting may be maintained, and rubbing contact between the cutter and the workpiece may be maintained while also maintaining a boundary layer between the two parts, or the cutting edge may be spaced from the workpiece at the point of cutting.

The bathing fluid may be an electrolyte, such for example as an aqueous solution of sodium silicate, or phosphoric acid, or boric acid, or simply tap water, or it may be a dielectric fluid, or a mixture of one or more electrolytes and one or more dielectric fluids may be used. Although usually a liquid will be employed, the bathing fluid may be a gas or a vapour such as water vapour or a mixture of one or several gases and one or several vapours having a substantially lower dielectric strength than air.

In the practice of the invention when applied to saw cutting machines utilising a rotary disc cutter, the body of the disc is formed of, or provided with a coating of, suitable insulating material and the cutting edge proper is preferably formed as a series of electrically conducting segments connected in any appropriate manner with one pole of a suitable source of electrical supply, preferably through a commutator or a slipring which polarizes the segments in turn as they approach the cutting point or maintains them constantly polarized during operation of the apparatus. The disc body may be moulded of electrically non-conductive material which may or may not be of abrasive nature with metal segments let into its periphery, or it may be equipped at its periphery with an annular ring or rings of suitable conductive material. In the case of milling cutters the contour producing part may be similarly detachable and replaceable.

The cutter may be carried in a stationary stand and the requisite feed motion of the workpiece past the cutter may be effected by the manual or automatic movement in the desired directions of a movable table or combination of slides carrying the cutter.

When applied to a band-type or a wire-type cutter, the band or wire is connected with one pole of the electric supply and the workpiece to be cut is connected with the other pole, the electrolyte or dielectric fluid bathing the workpiece and the cutter at the place of cutting and serving as a cooling medium. The electric connection of the wire or band with the one pole of the electric supply may be conveniently effected by means of brushes bearing on the band or wire, preferably adjacent to the place of cutting.

Figure 2:
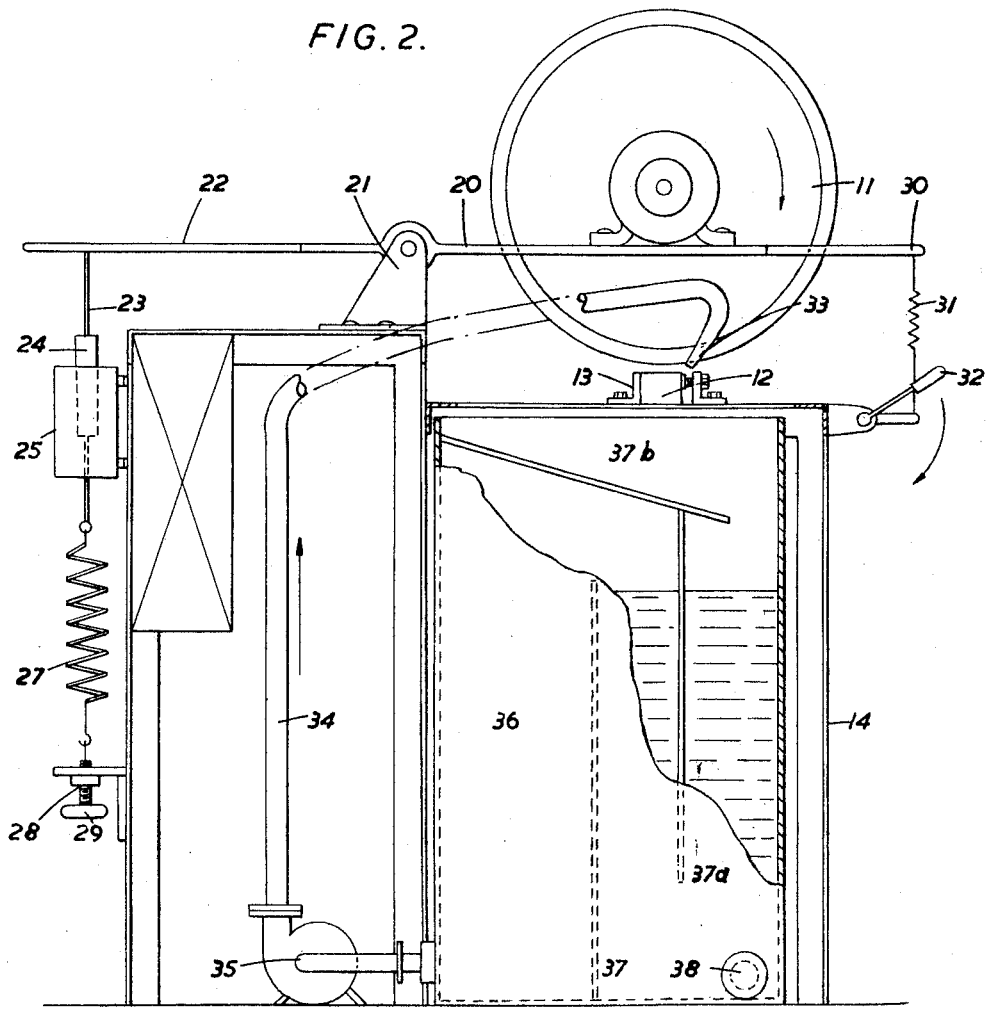
Figure 3:
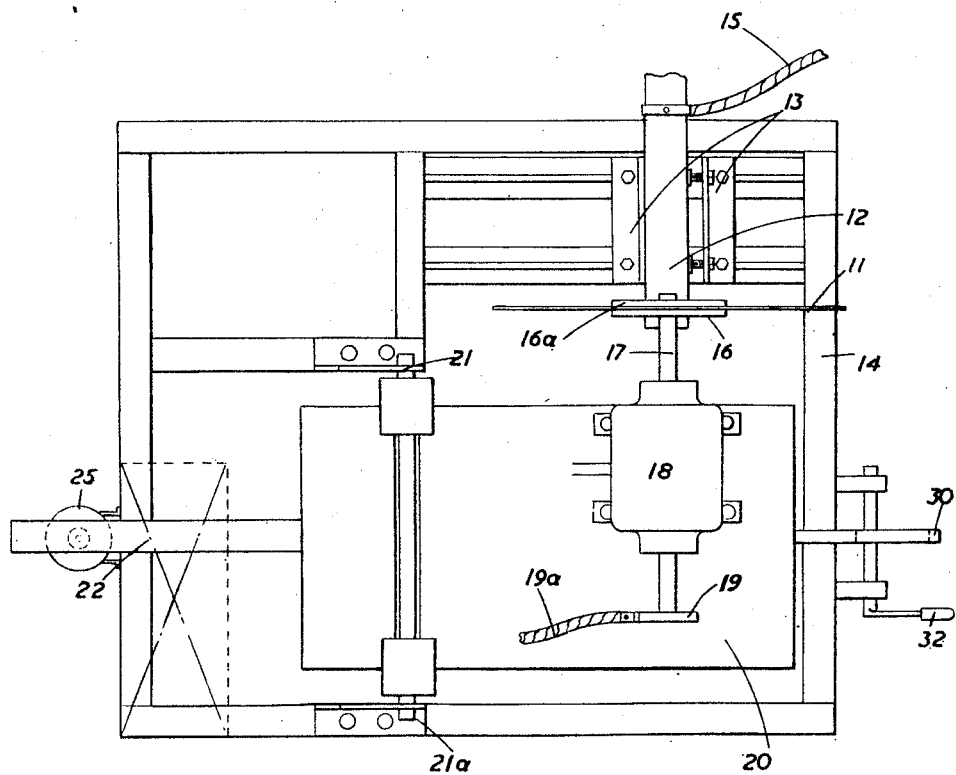
Figure 4:
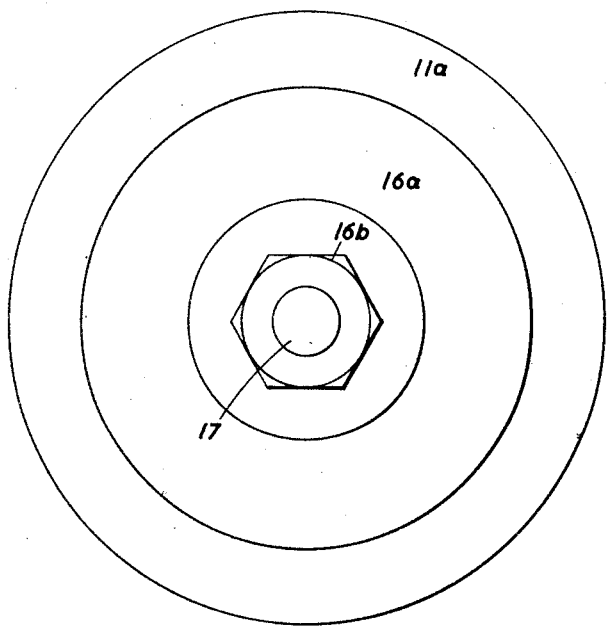
Figure 5:
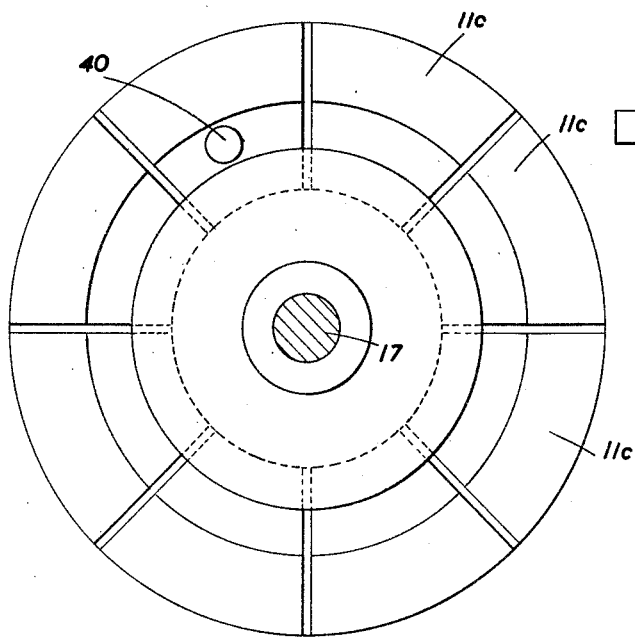
Figure 7:
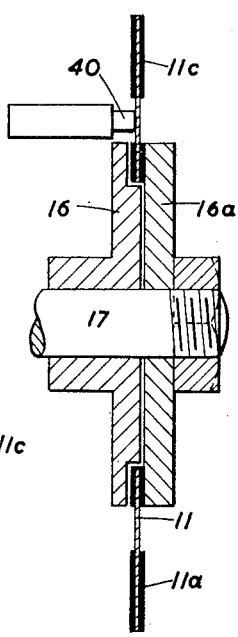
Figure 8:
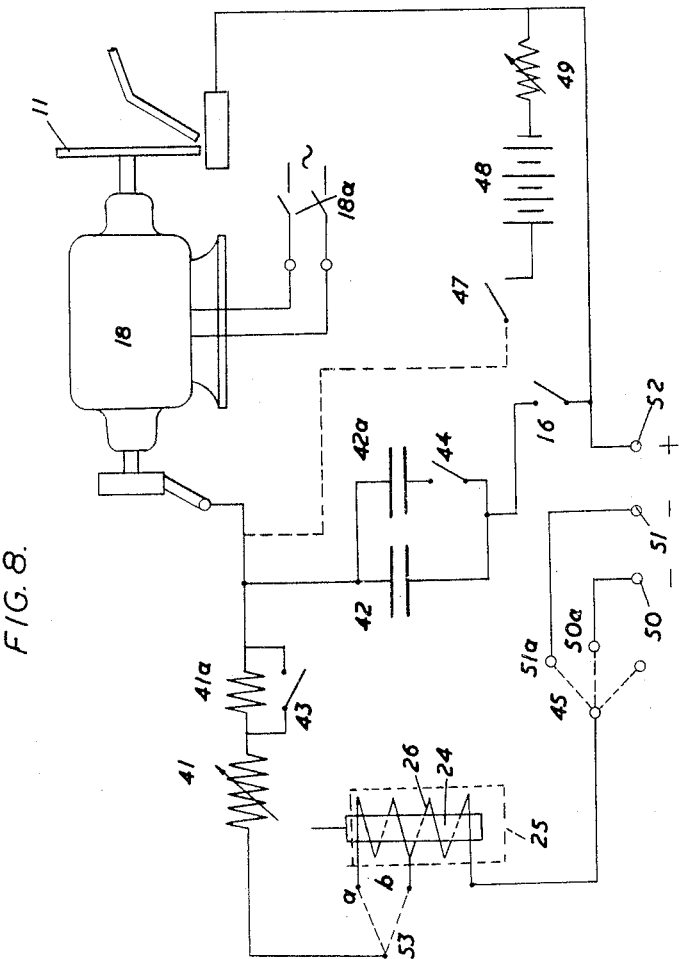
Figure 9:
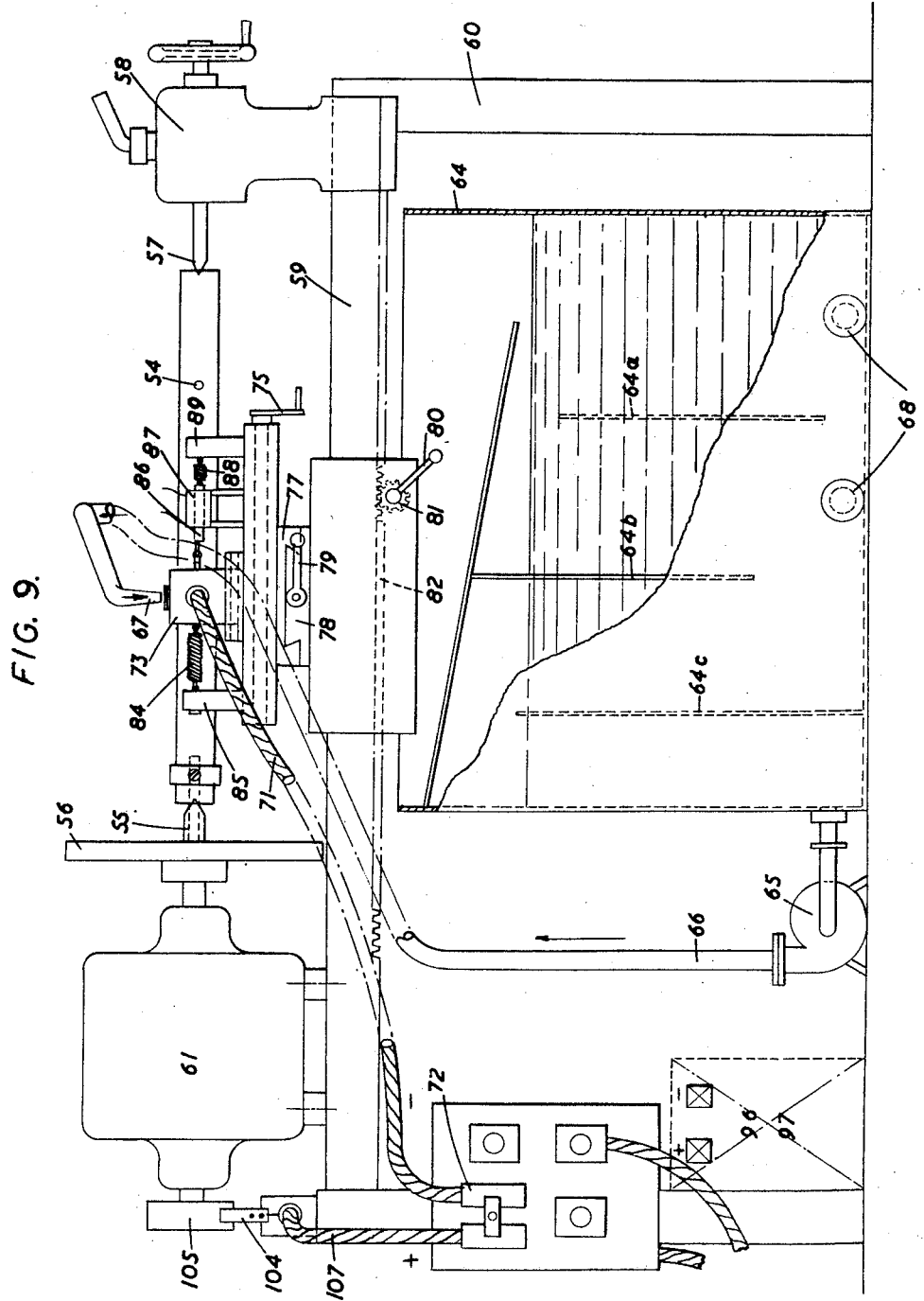
Figure 10:
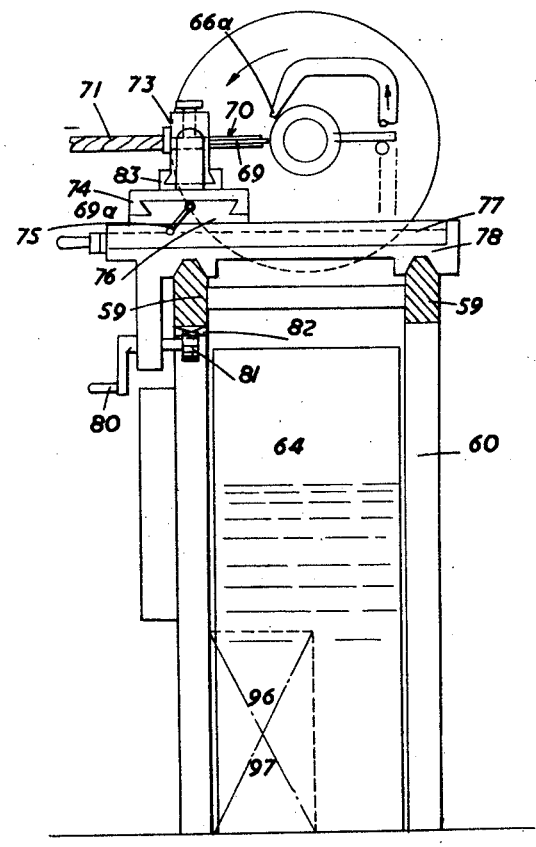
Figure 11:
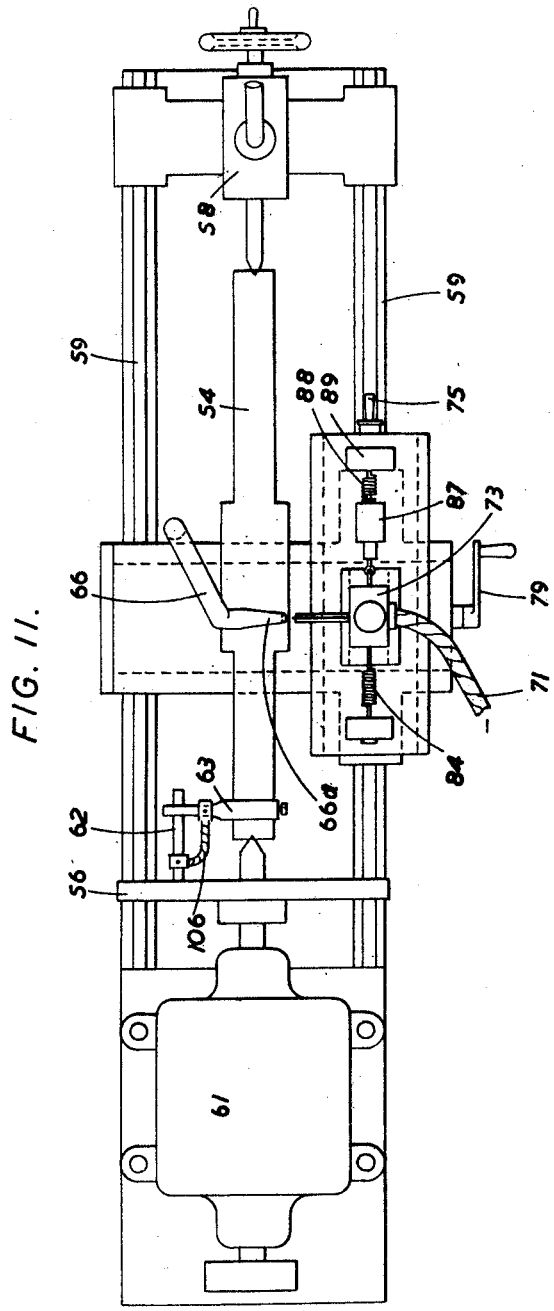
Figure 12:
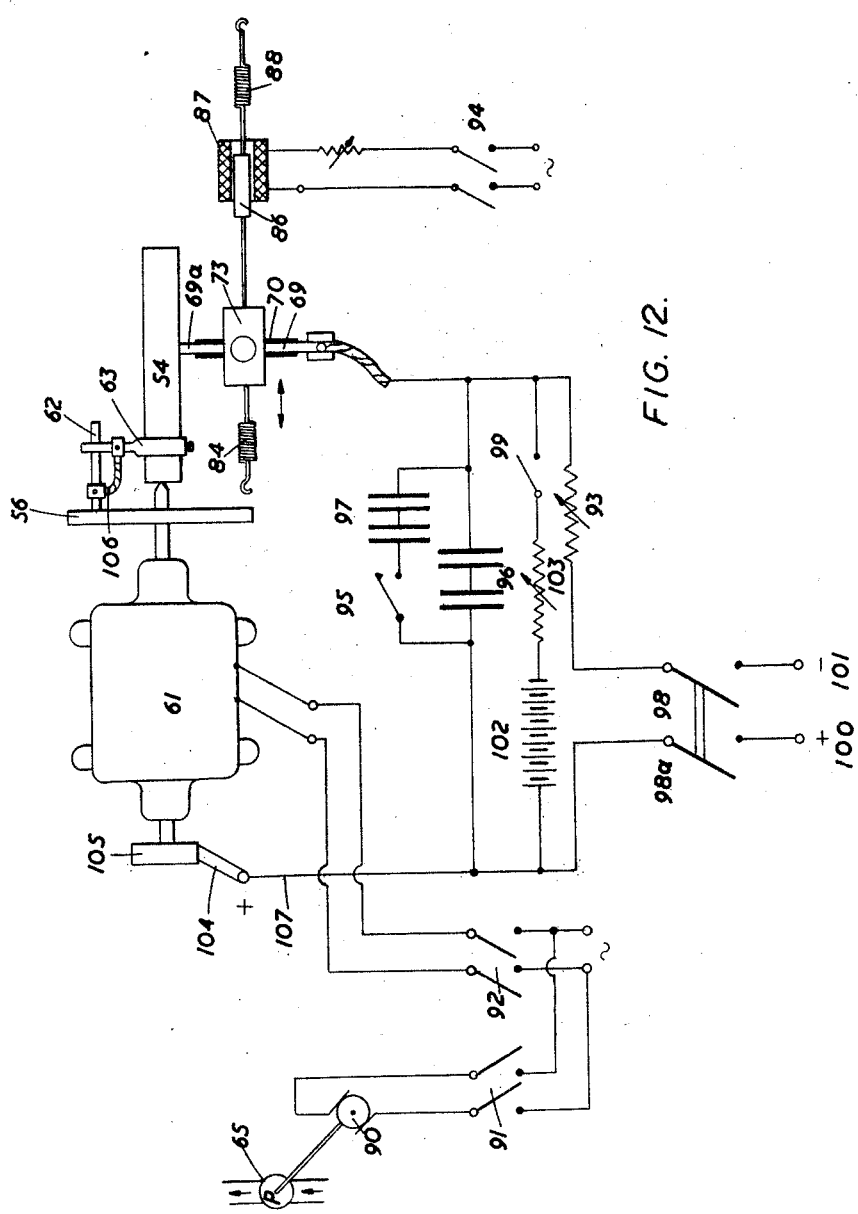

Reference will now be had to the accompanying drawings in which Fig. 1 shows diagrammatically a wire type cutter. Fig. 2 is a sectional elevation of a rotating disc type cutter according to the present invention. Fig. 3 is a plan view of the rotating disc cutter shown in Fig. 2, Figs. 4 and 5 are enlarged elevation views and Figs. 6 and 7 corresponding sectional views of two different types of cutter discs such as may be used in rotating disc cutters of the type shown in Figs. 2 and 3. Fig. 8 is a diagram of the electrical circuit employed with the rotating disc cutter shown in Figs. 2 and 3. Figs. 9 and 10 are sectional views and Fig. 11 a plan view of a device for the machining of bodies of rotation according to the present invention, while Fig. 12 shows the electrical circuit employed with such an apparatus.

Referring now to the drawings, but first more particularly to Fig. 1 showing a wire type cutter in which 1 designates a travelling endless wire carried by two insulated wheels 2 and 3, 4 is the workpiece shown resting on the bottom of a trough 5 of insulating material for the electrolyte which is fed to the point of cutting by a pump 6 through a pipe 7. Electrolyte from the trough 5 passes downwardly to a settling tank 8 for the separation of suspended particles, the cleaned electrolyte passing thence to the pump 6 for recirculation.

The negative pole of the supply circuit is connected to the wire 1 through the medium of a brush 9 and the positive pole is connected to the workpiece at 10.

In operation the workpiece 4 is slightly pressed against the travelling wire 1 and is bathed with electrolyte as cutting proceeds.

In Fig. 2 the numeral 11 designates the disc employed for cutting the workpiece 12 which is held in a clamping device 13 electrically insulated from the frame 14 of the machine. Electric current of positive polarity is supplied to the workpiece 12 through a cable 15. The cutter disc 11 is held between the flanges 16 and 16a attached to the shaft 17 of the electric motor 18. The said shaft 17 carries a slipring 19 supplied with electric current of negative polarity through the cable 19a. The slipring 19 is in electro-conductive connection with the shaft 17 so that current is passed from the cable 19a through the shaft 17 to the cutter disc 11. The motor 18 is electrically insulated from its supporting structure 20 and from the framework 14 of the machine. The said structure 20 is pivoted in the bearings 21 and 21a affixed to the framework 14 of the machine. To the lever 22 forming part of the structure 20 is connected by means of a rod 23 the core 24 of a solenoid 25 equipped with a tapped winding 26 (Fig. 8). To the lower part of the said core 24 is attached a helical spring 27 the tension of which can be adjusted by turning a handwheel 29 of an adjusting screw 28. At point 30 of the pivoted structure 20 is attached a helical spring 31 which can be tensioned by depressing a lever 32. The said lever 32 is self-locking in known manner so that once the handle is depressed beyond a certain point, it will remain in the depressed position and thus keep the spring 31 tensioned until the lever is pulled upwardly by hand. The bathing liquid is directed upon the point of cutting by a mouthpiece 33 of a liquid supply line 34 supplied with liquid by a pump 35 which latter draws the bathing liquid from the liquid container and settling tank 36 equipped with baffles 37, 37a, 37b, and a clean-out and drain opening 38. Filling of the said tank 36 with bathing liquid in order to make the machine ready for operation is accomplished by pouring the required quantity of liquid in at the open top of the said tank.

Figure 6:
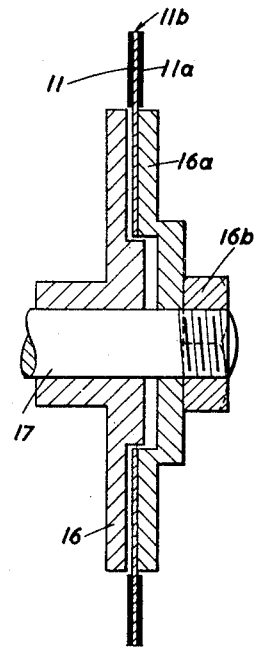

In Figs. 2 and 3 the cutting machine is fitted with a cutter disc which is shown in more detail in Figs. 4 and 6. Here the shaft 17 of the electric motor 18 is provided with a flange 16 suitably keyed to said shaft. The metallic cutter disc 11 is held concentrically between the recessed parts of the fixed flange 16 and the removable flange 16a pressed against the disc 11 by means of a nut 16b engaging the screw thread cut in at the end of the shaft 17. The surface of the cutter disc 11 contained between flanges 16 and 16a is uncovered so that metallic electro-conductive contact between its surface and the flanges obtains while the protruding annular portion 11a is covered on both sides with a thin layer of insulating material which may be a varnish. Or, if aluminium is used as the material of the cutter disc the annular portion 11a may be electrically insulated by an anodically or chemically produced layer of electrically non-conductive aluminium oxide. Electric current can therefore only pass from the peripheral edge 11b to the point of cutting at the workpiece. In the modified design of cutting disc as shown in Figs. 5 and 7 the metallic cutter disc is replaced by a number of metallic segments 11c insulated from each other where they are contained between the flanges 16 and 16a and also insulated at both sides over a radial distance corresponding with the maximum depth of cut to be produced. An annular portion between rim and flange of each segment is seen to be left uninsulated so that electrical contact between the segments 11c and a contact brush 40 will be established whenever a particular segment during rotation of the cutter disc passes across said brush. Therefore only one segment will be polarised at a time when the machine is in operation and it will be readily understood that in order to effect cutting operation the brush must be so positioned in relation to the cutting point of the workpiece that each segment is polarised as it passes the point of cutting.

The electrical circuit of the disc cutter in accordance with Figs. 2 and 3 is shown in Fig. 8. Here the shaft of the electric motor 18 carrying the cutter disc 11 is seen to be supplied with electric current from one of two electric terminals 50 and 51 of negative polarity through two adjustable ballast resistors 41 and 41a placed in series with the tapped winding 26 of a solenoid 25. Numerals 42 and 42a designate two electric condensers each of which by way of example may have a capacity of 200 microfarads.

The machine according to Figs. 2 to 5 can be operated either for cutting by establishing spark action while maintaining rubbing contact between cutter disc and workpiece with the maintenance of a liquid boundary layer between cutter and workpiece, or for cutting by establishing spark action across a gap passed by a stream of bathing liquid between cutter and workpiece. Cutting with rubbing contact with the contact pressure amounting maybe to some two pounds will generally be preferred when a clean cut is to be obtained, while cutting with maintenance of a gap passed by a stream of bathing liquid will be conducive to more intense cutting action but to producing a rougher cut.

Operation of the machine with rubbing contact is carried out as follows: After the workpiece to be cut has been secured in position the motor driving pump 35 is started in order to circulate bathing fluid which may be tap water to which a small amount, say one-half percent by weight of boracic acid crystals have been added. The nozzle 33 of the fluid supply pipe 34 is then trained upon the point of intended cutting. Next the motor 18 is started by closing the switch 18a care being taken that lever 32 is still in its topmost position. Owing to the preponderant pull of spring 27 the cutter disc 11 will now rotate free of the workpiece. Switch 53 is brought into position 53b. Switch 45 is now brought into the position 51a so that the circuit of the machine is energised from terminals 51 and 52, across which a potential difference of say 20 volts is provided from a source of direct current supply. Switch 43 is closed, while switches 16 and 47 are left open. If lever 32 is now slowly depressed, the distance between the cutting edge 11b of the revolving cutter disc 11 and the workpiece 12 will be diminished to a point where the thin film of bathing fluid maintained between periphery of the cutting disc and the workpiece is bridged by a multitude of spark discharges, resulting in an electrical current which cannot however exceed a maximum value set by the amount of ohmic resistance offered by the adjustable resistor 41. Once the spark action has been initiated in the aforementioned manner, the electric current passing through part of the winding 26 of the solenoid will create a magnetic field tending to pull the core 24 into the solenoid 25 thus counteracting the pull of the helical spring 31. It will be readily understood that by adjusting the tension of the helical spring 27 by means of the handwheel 29 the magnitude of current producing the spark effect and with it the cutting action can be adjusted to a desired value, at which it will then be automatically maintained owing to the corrective action of the solenoid, that is to say, the solenoid will exert a greater pull and thus decrease the rubbing pressure whenever the current intensity rises above its predetermined value and exert a smaller pull and thus increase the rubbing pressure produced by the spring 31 whenever the current intensity falls below its predetermined value.

When it is desired to operate the machine with the maintenance of a spark gap passed by a stream of bathing fluid, which gap is usually chosen not to exceed 20 thousandths of an inch, the following operating procedure is followed. After the workpiece 12 to be cut has been secured in place, circulation of the bathing liquid is established in the aforementioned manner and motor 18 is started, the lever 32 being in its topmost position. Switch 45 is moved into position 50a so that the machine is now connected to a direct current voltage of maybe 200 volts, switch 16 is closed thereby connecting the condenser 42 across the spark gap to be maintained between cutting edge and workpiece. Switch 43 is opened as with spark gap operation a smaller maximum amperage is desired than with rubbing operation. In order to compensate for the smaller amperage passing through the solenoid coil 26 switch 53 is moved into position 53a so that the solenoid 25 will now exert the force required to maintain the gap at the width required for maintaining the predetermined cutting current. The function of the condenser 42 is to produce intensified intermittent spark discharges resulting in cutting action, the intensity of the cutting action within certain limits being a function of the condenser capacity. Thus where a cutting action of greater intensity is required the switch 44 may be closed thereby increasing the effective condenser capacity and with it the cutting action. Cutting action is initiated by depressing the lever 32 slowly into its lowest position, the action of the solenoid then adjusting the spark gap to its value corresponding to the predetermined intensity of the cutting current.

When operating the machine with rubbing action, it may be preferred to initiate the spark discharge by temporarily impressing a higher voltage upon the cutting circuit so as to establish ionisation and subsequent spark discharge. If required this same procedure may also be employed for initiating operation of the machine when employing spark gap operation. This higher voltage is impressed by temporarily closing switch 47 thus establishing the potential difference of an electric source 48 between cutter disc and workpiece. In order to prevent the creation of an electric arc, the resistor 49 is so adjusted that even if metallic contact between cutter and workpiece were allowed to occur, the resultant current intensity would still be below the minimum current intensity required for the production of an electric arc. Once the first spark has been produced in this manner its ionising action will have opened the way to the establishment of the spark discharge owing to the normal operating voltage obtained from the source to which terminals 51 and 52 are connected. In this case the voltage of the temporary supply source 48 will be chosen above that obtainable from terminals 51 and 52.

The machine according to my invention shown in Figs. 9, 10, 11 and 12 is intended for the machining by spark action of bodies of rotation such as the workpiece 54 shown supported between a centre 55 of a driving head 56 and a centre 57 of a tail stock 58 slidably arranged on the bed 59 forming part of the structure 60. Rotary motion is imparted to the said workpiece 54 by an electric motor 61 carrying the driving head 56 a driving pin 62 of which engages a driver 63 clamped on to the workpiec 54. Within the frame 60 of the machine and beneath the working bed of the machine is arranged an open-top tank 64 containing the bathing fluid which may be ordinary tap water and which is withdrawn from the said tank by means of the pump 65 and conducted through pipe 66 to the nozzle 67 from whence the stream of bathing fluid is discharged onto the zone of cutting. The bathing liquid is subsequently drained back by gravity into the open top of the said tank 64 in which it is passed over a series of baffles 64a, 64b, 64c, causing entrained metal particles originating from the cutting action to settle out on the bottom of the tank from whence when required they can be removed through the cleanout holes 68.

The cutting electrode consists of a rod of metal 69 sheathed in a layer 70 of insulating material so that only the cutting point 69a from which the spark discharge issues is exposed. To the other end of the electrode rod 69 the cable 71 is affixed which cable is connected with the terminal 72 of negative polarity. The electrode is clamped in the toolpost 73 from which it is electrically insulated by sheath 70. The toolpost is slidably carried on the top of a slide 74 which latter by means of a driving screw manually operated by the handle 75 can be made to travel in a direction parallel with the centre to centre line of the machine centres 55 and 57, the said driving screw being carried in the base 76 forming the top part of a transverse slide 77 which in turn can be moved by manual operation of the handle 79 of the driving screw carried in the base 78. The said base 78 rests slidably across the two longitudinal beams of the bed of the machine and can be moved along the said bed by means of the manually operated handle 80 of a pinion 81 engaged with the gear rack 82 affixed to the underside of the bed of the machine. The said tool post 73 is slidably arranged in a suitably dovetailed guide 83 on top of the said slide 74 and on one side is subjected to the tension of a spring 84 attached to it, the other end of said spring being affixed to a post 85 bolted to the top of said slide 74. The opposite side of the said slidable toolpost 73 is provided with a pull rod to which is connected one end of the core 86 of a solenoid 87 the other end of the said core being attached to one end of the spring 88 the other end of which is attached to the stationary post 89. The relative tensile actions of springs 84 and 88 are so selected that the pull of spring 84 is preponderant and draws the tool post toward the left hand side as long as the solenoid 87 remains un-energised. However when the machine is in operation the said solenoid 87 is energised with alternating current so that in accordance with the frequency of the said alternating current the cyclically exerted pull toward the right hand side produced by the magnetic force exerted by the solenoid upon the core 86 will cyclically prevail over the preponderant force of spring 84 and cause the toolpost to slide to and fro in its guide in vibratory manner, the amplitude of these vibrations as a rule not exceeding a small fraction of an inch. These vibrations are produced for the purpose of producing a smoothly machined surface during the cutting process.

Operation of the machine shown in Figs. 9 to 12 is preferably carried out as follows. First the workpiece is placed between the centres 55 and 57 and the cutting point 69a of the electrode is moved opposite the place where the cutting action is intended to commence. The distance between the cutting point of the electrode and the workpiece is then adjusted to the required magnitude by moving the slide in the appropriate direction by manually turning handle 79. Next the pump motor 90 is set in operation by closing switch 91 connecting the said motor with the electrical supply system, and the motor 61 of the driving head 56 is set in motion by closing switch 92. The nozzle 66a of the liquid supply pipe 66 is now trained upon the intended point of cutting, from whence the liquid is returned by gravity into the open top of the liquid tank 64. Next the ballast resistor 93 is adjusted to the desired maximum amperage of cutting current and the switch 94 energising the solenoid vibrator coil 87 is closed connecting the said vibrator coil with a source of alternating current supply. The switch 95 is left open or closed so that either condenser 96 alone or both condensers 96 and 97 are operative according to whether a smooth cut or a roughing cut is required. Finally the switch 98 is closed so that both cutting electrode and workpiece are polarised, current flowing to the workpiece 54 from the positive terminal 100 by way of the switch 98, the cable 107, the brush 104, the slipring 105, the shaft of the motor 61 and a flexible connection 106 connecting the driving pin 62 with the driver 63. Also, the positive terminal 98a is electrically connected with the framework 60 of the machine.

While sparking could be initiated by temporarily approaching the cutting electrode more closely to the workpiece, it is preferred to keep the electrode at its normal working distance from the workpiece and to produce ionisation and initial spark discharge by temporarily impressing a higher voltage upon the circuit this being accomplished by temporarily closing the switch 99 so that an auxiliary voltage from the source 102 which is higher than the normal working voltage, suitably a voltage of 350 volts as compared with a normal working voltage of 200 volts at the terminals 100 and 101, is made to prevail at the gap between cutting electrode and workpiece so that the bathing liquid present in the gap becomes sufficiently ionised to permit the passage of an initial spark causing the establishment of the normal cutting spark discharge due to the potential difference maintained at the terminals 100 and 101.

The occurrence of an arc between cutter and workpiece when passing the initial spark by temporarily closing switch 99 in the manner described above, is precluded by the provision of the ballast resistor 103. Once the cutting action is established, the cutting electrode can be moved along the workpiece by turning the handle 75 of the longitudinal slide 74, the feed rate being adjusted in accordance with the depth of cut to be produced.

It will be readily understood that the machining by spark cutting with a machine of this type can be extended to all those machining operations performable with lathes of ordinary design adapted to the use of mechanical cutting tools, including the cutting of screwthreads. Also all feeding movements of the electrode may be performed automatically by, for instance, deriving the movement of the tool slides in known manner from a lead screw in the manner employed in ordinary lathes.

In all cases means may also be provided to automatically interrupt the electric circuit of which cutter and workpiece form a part in the event of the bathing fluid becoming contaminated with suspended or entrained metal particles produced in the cutting process to such an extent that further operation would cause arcing between cutter and workpiece.

In the case of a rotary drill cutting by the erosive action of electric spark discharges, the drill may be hollow and the bathing fluid be fed through the hollow shank so that it also effects cooling, and the external surfaces of the shank preferably are insulated so as to concentrate the current discharge resulting in spark action to the drill tip and thereby enhance the cutting rate.

What I claim is:

1. Apparatus for cutting electrically conductive materials consisting of a cutter member the cutting edge of which is maintained during the cutting operation in a predetermined close relation to the metal to be removed from the workpiece, an electric circuit in which are included the cutter member and the workpiece, and a source of direct current supply in such manner that the cutter member is of negative polarity and the circuit being so adjusted that the electric oscillations of a spark discharge are continuously produced at the cutting edge of the cutter member, and means maintaining while cutting is in progress a fluid flow through the cutting zone to remove therefrom the particles of material disintegrated from the workpiece and to keep the cutting zone continually cooled.

2. Apparatus for cutting materials according to claim 1, in which relative motion and pressure contact is maintained between the cutter member and the workpiece at the location of the cut without disturbing the boundary layer of fluid at such location.

3. Apparatus for cutting materials consisting of a cutter member the cutting edge of which is maintained during the cutting operation in a close relation to the metal to be removed from the workpiece, an electric circuit in which are included the cutter member and the workpiece, and a source of direct current supply with the workpiece as the positive pole in such manner that the electric oscillations of a spark discharge are continuously produced at the cutting edge of the cutter member, and means maintaining while cutting is in progress a fluid flow through the cutting zone to remove therefrom the particles of material disintegrated from the workpiece and to keep the cutting zone continually cooled, including insulating means for concentrating the current discharge at or in the vicinity of the cutting edge of the cutter member and thereby confining the spark effect to the zone of the cut being made in the workpiece.

4. Apparatus for cutting materials according to claim 3 in which the cutting edge is located at the periphery of a rotary cutter disc the side surfaces or cheeks of which are insulated against the passage of electric current.

5. Apparatus for cutting materials according to claim 3 having the cutting edge formed of metal segments mounted on an insulating disc and insulated from one another, the segments being polarized in turn, as they approach the cutting point, through the medium of a commutator or a slip-ring.

6. Apparatus for cutting materials as claimed in claim 1, in which the cutter member is in the form of a band of metal, in combination with means for collecting the fluid from the cutting zone, means for cleaning the collected fluid of suspended particles, and means for circulating the cleaned fluid back through the cutting zone.

7. The method of cutting electrically conductive materials consisting in connecting the material to the positive pole of a source of direct current supply, the negative pole whereof is connected to a cutter electrode and in producing and continuously maintaining a spark discharge between the material and the electrode at the location to be cut by limiting the current passing while also maintaining a constant flow of fluid at such location and thus preventing the formation of an arc.

8. The method of cutting electrically conductive materials consisting in connecting the material in circuit with a source of direct current supply, the negative pole whereof is connected to a cutter electrode in proximity with the material and which circuit is rendered oscillatory by the inclusion of a capacitance in parallel with the cutter and material, limiting the current passing and maintaining a fluid flow to the material adjacent the cutter such that a spark discharge is continuously produced to effect cutting of the material and the cutting zone is continually cooled.

9. The method of cutting electrically conductive materials according to the preceding claim 8 wherein the flanks of the cutting electrode are insulated to concentrate the spark discharge and limit the area over which the material is subjected to cutting action.

DAGOBERT WILLIAM RUDORFF.

REFERENCES CITED

The following references are of record in the file of this patent:

UNITED STATES PATENTS

| Number | Name | Date |
|---|---|---|
| Re. 20,035 | Strohel | July 14, 1936 |
| 416,873 | Tilghman | Dec. 10, 1889 |
| 650,124 | Coleman | May 22, 1900 |
| 1,350,734 | Overlin | Aug. 24, 1920 |
| 1,394,965 | Bourne | Oct. 25, 1921 |
| 1,701,919 | Grumpelt | Feb. 12, 1929 |
| 2,059,236 | Holslag | Nov. 3, 1936 |
| 2,173,450 | Larsen et al. | Sept. 19, 1939 |
| 2,319,401 | Hebeler | May 18, 1943 |
| 2,330,503 | Longoria | Sept. 28, 1943 |
| 2,346,975 | Laboulais | Apr. 18, 1944 |
| 2,383,382 | Harding | Aug. 21, 1945 |
| 2,411,522 | Chevigny | Nov. 26, 1946 |
| 2,458,871 | Oles | Jan. 11, 1949 |

FOREIGN PATENTS

| Number | Country | Date |
|---|---|---|
| 345,941 | Great Britain | Mar. 24, 1931 |